(12) United States Patent
Lee et al.

(10) Patent No.: US 7,942,564 B2
(45) Date of Patent: May 17, 2011

(54) OVERSPEED PREVENTION STRUCTURE USING PLASTIC OPTICAL FIBER

(75) Inventors: Jong-Chan Lee, Seoul (KR); Gi-Seung Choi, Gunsan-si (KR); In-Sung Her, Euiwang-si (KR)

(73) Assignee: Kumho Electric, Inc., Seoul (KR)

( * ) Notice: Subject to any disclaimer, the term of this patent is extended or adjusted under 35 U.S.C. 154(b) by 226 days.

(21) Appl. No.: 12/146,589

(22) Filed: Jun. 26, 2008

(65) Prior Publication Data

US 2009/0003013 A1      Jan. 1, 2009

(30) Foreign Application Priority Data

Jun. 28, 2007 (KR) .................. 10-2007-0064275

(51) Int. Cl.
*F21S 4/00* (2006.01)
*E01F 9/047* (2006.01)
*E01C 17/00* (2006.01)

(52) U.S. Cl. ................... 362/576; 362/153.1; 404/22

(58) Field of Classification Search ............... 362/576, 362/559, 145, 153, 153.1; 404/22

See application file for complete search history.

(56) References Cited

U.S. PATENT DOCUMENTS

| 3,585,585 | A  | * | 6/1971 | Grosz ......................... 362/84 |
| 6,116,751 | A  | * | 9/2000 | Remp ......................... 362/153 |
| 6,259,375 | B1 | * | 7/2001 | Andras ....................... 340/907 |
| 6,398,399 | B1 | * | 6/2002 | Neophytou ................... 362/576 |
| 6,523,986 | B1 | * | 2/2003 | Hoffmann .................... 362/576 |
| 7,021,786 | B1 | * | 4/2006 | Sandor, Sr. .................. 362/153 |
| 7,044,679 | B2 | * | 5/2006 | Groff ......................... 404/16 |
| 7,229,203 | B2 | * | 6/2007 | Lath .......................... 362/576 |

FOREIGN PATENT DOCUMENTS

JP    2001032226 A  *  2/2001
KR       806209 B1  *  2/2008

* cited by examiner

*Primary Examiner* — Jong-Suk (James) Lee
*Assistant Examiner* — David R Crowe
(74) *Attorney, Agent, or Firm* — Holme Roberts & Owen LLP

(57) ABSTRACT

An overspeed prevention structure is disclosed herein. The overspeed prevention structure according to the present invention comprises a structural body having a curved convex upper surface; an external light source; and a plastic optical fiber embedded in the structural body and connected electrically to the external light source so as to emit the light outside the structural body.

2 Claims, 3 Drawing Sheets

& # x 20; # OVERSPEED PREVENTION STRUCTURE USING PLASTIC OPTICAL FIBER

CROSS-REFERENCE TO RELATED APPLICATIONS

This application claims priority from Korean Patent Application No. 10-2007-0064275 filed on Jun. 28, 2007, the contents of which are incorporated herein by reference in its entirety.

BACKGROUND OF THE INVENTION

The present invention relates to an overspeed prevention structure and, more particularly, to an overspeed prevention structure which can enhance perceptivity and reliability through embedding a plastic optical fiber in a structural body.

Generally, a conventional overspeed prevention structure is configured by forming a bump made of urethane or asphalt, and applying a paint including reflective materials, such as glass powder and so on, on the surface of the bump.

However, for a conventional overspeed prevention structure, the durability of the reflective materials is reduced due to the influence of various environmental changes (water submersion, heat, shock). Perceptivity and reliability of the overspeed prevention structure is accordingly degraded, and consequently the conventional overspeed prevention structure may damage vehicles, create unpleasant feelings for passengers, be damaged itself, cause accidents and so on.

SUMMARY OF THE INVENTION

Accordingly, the present invention is conceived to solve the above described problems of the overspeed prevention structure, and an objective of the present invention is to provide an overspeed prevention structure which can enhance perceptivity and reliability by using a plastic optical fiber, and is durable to environmental changes like water submersion, heat and shock.

To achieve the above object, the overspeed prevention structure according to the present invention comprises a structural body having a curved convex upper surface; an external light source; and a plastic optical fiber embedded in the structural body and connected electrically to the external light source so as to emit the light outside the structural body.

In the overspeed prevention structure, the plastic optical fiber is disposed in the structural body in the shape of a loop so that a plurality of straight portions thereof are extended in parallel. The plastic optical fiber is disposed in the structural body in the lengthwise direction thereof in the shape of a wave having peaks and valleys disposed alternatively.

The overspeed prevention structure according to the present invention may further comprise transparent plates provided in the upper side of the structural body at the positions where the plastic optical fiber is disposed.

BRIEF DESCRIPTION OF THE DRAWINGS

The above and other features and advantages of the present invention will be described in detail with reference to the accompanying drawings in which.

DESCRIPTION OF SPECIFIC EMBODIMENTS

Hereinafter, the preferred embodiment of the present invention will be explained in more detail with reference to the accompanying drawings. However, it should be understood that the embodiment of the present invention can be variously modified, the scope of the present invention is not limited to the embodiment described herein, and the embodiment is provided to explain the present invention more completely to those skilled in the art.

Figure 1:
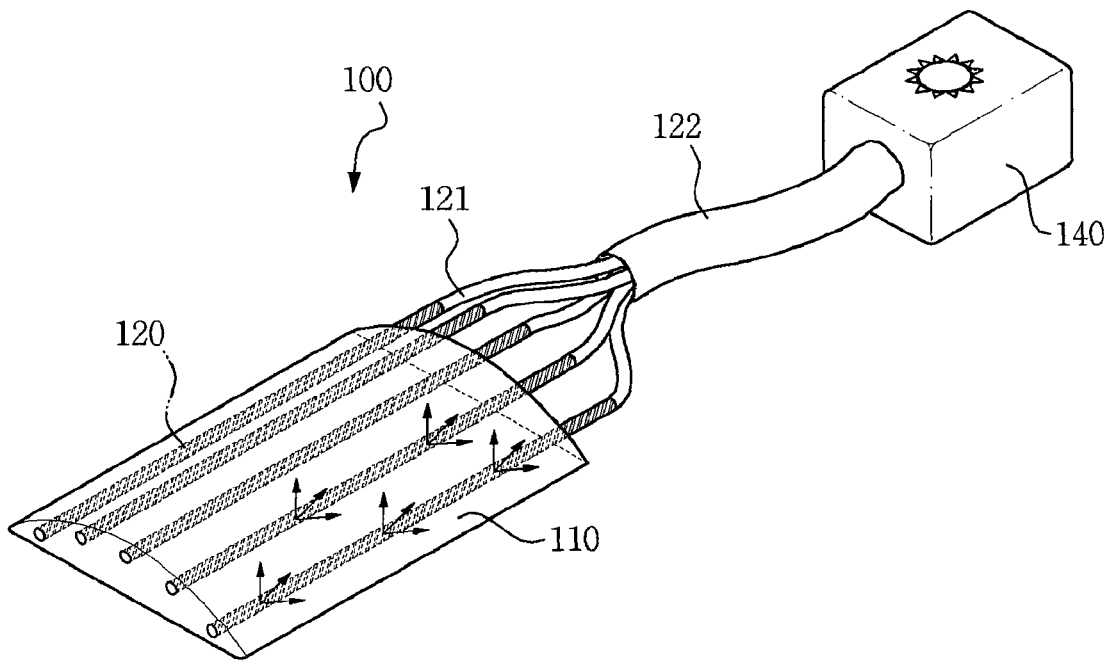
FIG. 1 is a perspective view of an overspeed prevention structure using a plastic optical fiber according to an embodiment of the present invention.
Figure 2A:
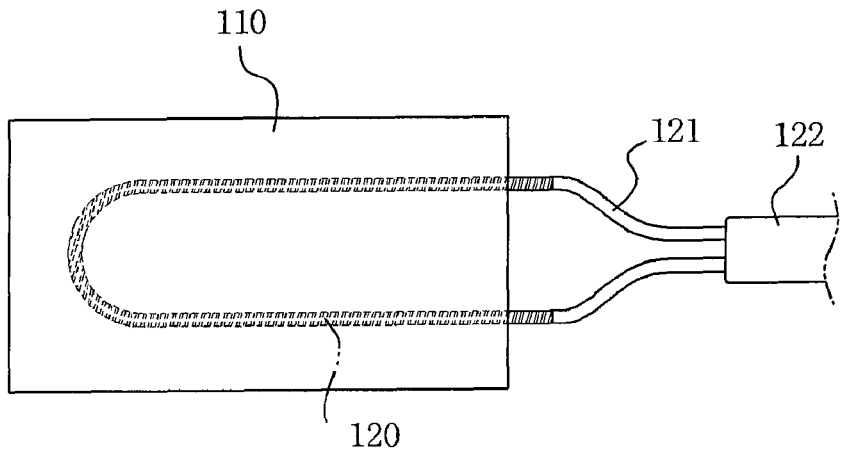
FIGS. 2A and 2B are exemplary views showing how the plastic optical fiber shown in FIG. 1 is installed.
Figure 2B:
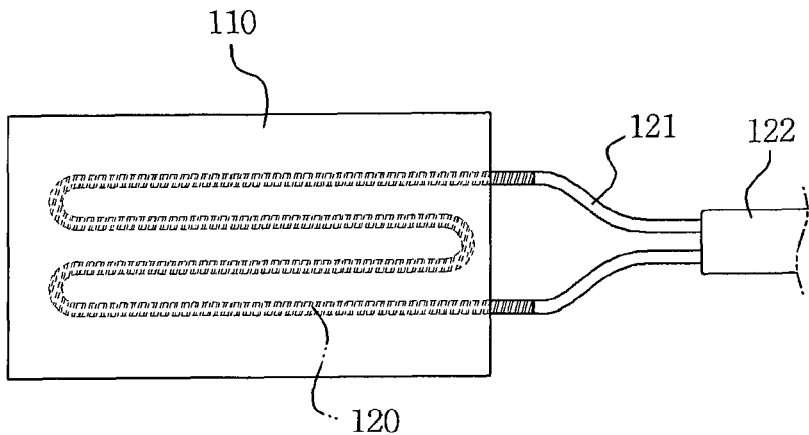
Figure 3A:
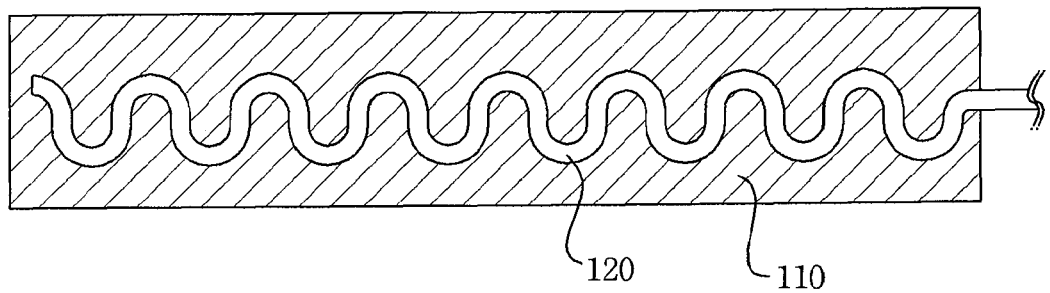
FIGS. 3A and 3B are a sectional view and a plane view illustrating how the plastic optical fiber of FIG. 1 in the overspeed prevention structure is formed in the shape of wave.
Figure 3B:
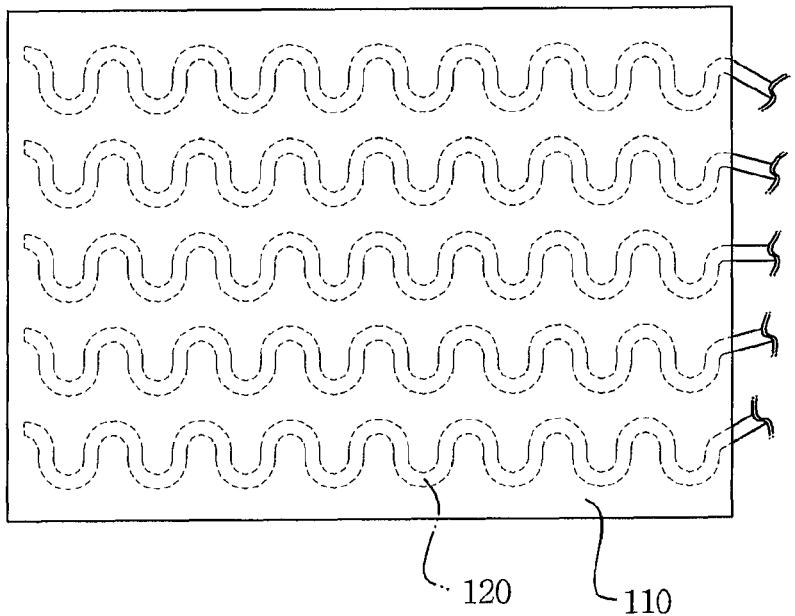
Figure 4:
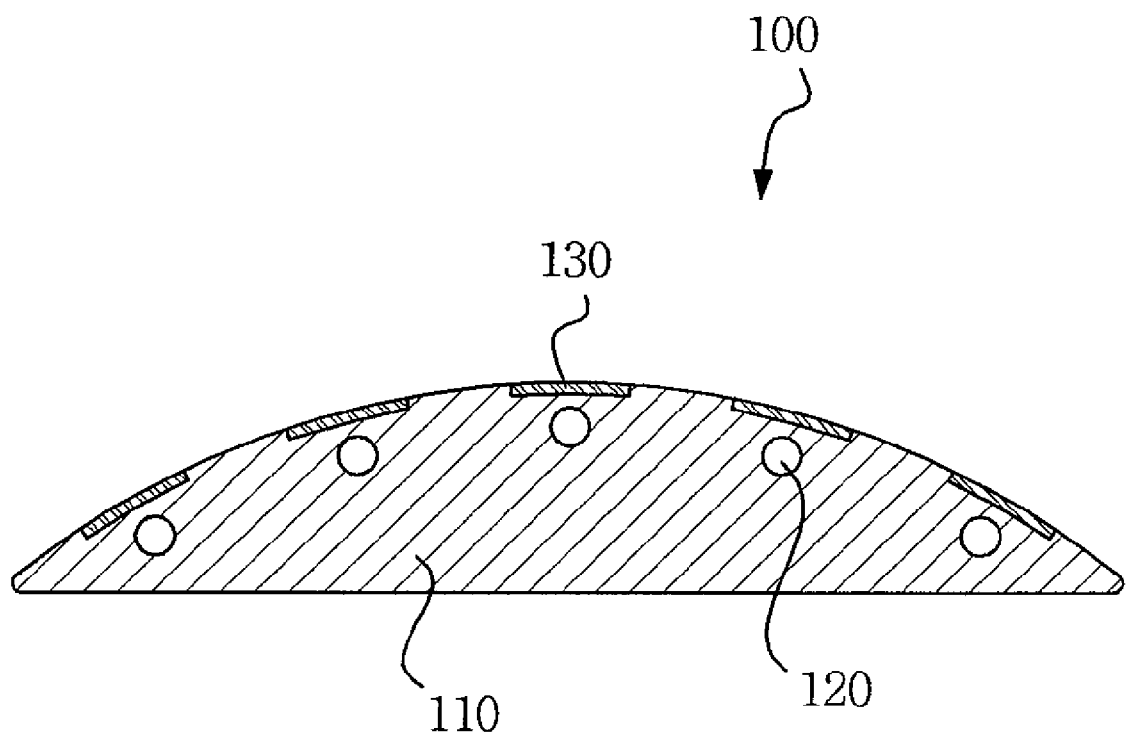
FIG. 4 is a sectional view of the overspeed prevention structure of the present invention comprising transparent plates embedded therein.

FIG. 1 is a perspective view of an overspeed prevention structure using a plastic optical fiber according to an embodiment of the present invention, FIGS. 2A and 2B are exemplary views showing how the plastic optical fiber shown in FIG. 1 is installed, FIGS. 3A and 3B are a sectional view and a plane view illustrating how the plastic optical fiber of FIG. 1 in the overspeed prevention structure is formed in the shape of wave, and FIG. 4 is a sectional view of the overspeed prevention structure of the present invention comprising transparent plates embedded therein.

As shown in the drawings, the overspeed prevention structure using POF 100 according to an embodiment of the present invention comprises a structural body 110 and a plastic optical fiber 120.

The structural body 110 has a shape which is similar to that of conventional overspeed prevention structures, and has a curved convex upper surface in order for vehicles to pass safely.

The structural body 110 may be made of synthetic rubber such as recycled tires and the like, a transparent urethane material or a transparent plastic material. If the structural body 110 is made of a transparent urethane or transparent plastic material, a light emitted from the plastic optical fiber 120 have increased transmittance due to the transparency, and accordingly perceptivity and reliability of the overspeed prevention structure 100 of the present invention may be enhanced.

The plastic optical fiber 120 in the overspeed prevention structure 110 is embedded in the structural body 110 and is configured to receive light emitted from an external light source 140. The plastic optical fiber 120 irradiates the light outside the structural body 110.

Here, in order to enhance the radiation effect from the light source, the plastic optical fiber 120 is provided at an upper side (that is, a side adjacent to an upper surface) of the structural body 110 as shown in FIG. 1. Preferably, the plastic optical fiber 120 is disposed along the curved line corresponding to the curved upper surface of the structural body 110.

The light source 140 may be any light source having excellent lighting capability such as a light emitting diode (LED), a high intensity discharge lamp (HID), halogen lighting and so on. It will be apparent that various light sources capable of emitting the light can be substituted for the light source.

Only one plastic optical fiber 120 may be embedded in the structural body 110 along the lengthwise direction of the structural body, or a plurality of plastic optical fibers 120 can be embedded in the structural body 110 along the lengthwise direction of the structural body in parallel as shown in FIG. 1. If a plurality of plastic optical fibers are arranged in the structural body 110, light sources (for example LED devices) may be connected to the plastic optical fibers 120, respectively.

In addition, as shown in FIG. 2A and FIG. 2B, the plastic optical fiber 120 may be disposed in the main body in the shape of a loop so a plurality of straight portions thereof are extended in parallel.

In other words, as shown in FIG. 2A, the plastic optical fiber 120 is arranged in the shape of one loop along the periphery of the structural body 110. Also, the plastic optical fiber 120 can be arranged in the shape of one loop with a zigzag shape obtained by bending a plurality of positions thereof.

Since the distance from the light source to an end of the plastic optical fiber 120 in the configuration shown in FIG. 2A and FIG. 2B is less than that of the configuration shown in FIG. 1, the light transmitting efficiency from the light to the plastic optical fiber may be enhanced.

The length of the plastic optical fiber 120 in the configuration of FIG. 2A and FIG. 2B is relatively longer than in the configuration of FIG. 1, so a light source of stronger intensity, and a greater number of light sources and so on may be required, however, the configurations of FIG. 2A and FIG. 2B have an advantage in that only one plastic optical fiber 120 can radiate light to a large area.

As shown in FIG. 1, FIG. 2a and FIG. 2b, a portion of the plastic optical fiber 120 between the structural body 110 and the light source 140 is configured to be integrally protected by an integrated cable 122, so an appearance problem or tangling of the plastic optical cable 120 and the like can be prevented.

An additional sealed part 121 may be formed on an outer circumference of the plastic optical fiber 120 between the structural body 110 and the light source 140. Here, the sealed part 121 may formed by a reflector material which surrounds the outer circumference of the plastic optical fiber 120 to prevent an outward diffusion of the light and an epoxy coating film which surrounds the reflective material to protect the reflective material.

Here, the reflector may be formed by forming a silver film, performing silver powder coating and the like, however, the present invention is not limited to the above reflector, and other known reflector having an excellent reflectivity may be substituted for the reflector.

Due to the above sealed part 121, an outward diffusion of the light transmitted along the path of the light (that is, the plastic optical fiber 120) is prevented, and so the loss of light may be prevented and the light transmitting efficiency from the light source to the plastic optical fiber op may be enhanced.

It will be apparent that the epoxy coater may be formed on the outer surface of the plastic optical fiber 120 embedded in the structural body 110 for protecting the outer circumferential surface of the plastic optical fiber.

As shown in FIG. 3A and FIG. 3B, in addition, the plastic optical fiber 120 may be arranged in the structural body 110 in the lengthwise direction thereof in the shape of a wave having peaks and valleys disposed alternatively to enhance the radiation efficiency of the light outside the structural body 110.

FIG. 3A is a sectional view showing that the plastic optical fiber 120 is arranged in the structural body 110 in the shape of a wave having peaks and valleys disposed in the vertical direction with respect to an upper surface of the structural body 110. FIG. 3B is a plane view showing the plastic optical fiber 120 is arranged in the structural body 110 in the shape of a wave having peaks and valleys disposed parallel to an upper surface of the structural body 110.

The direction of valleys and peaks of the plastic optical fiber 120 is not necessarily limited to the above.

As compared with the linear plastic optical fiber 120 shown in FIG. 1, in a case where the plastic optical fiber 120 has a wave shape as shown in FIG. 3A and FIG. 3B, the amount of radiated light may be increased, so there is an advantage that, although the structural body has the same size, the perceptivity and reliability of the overspeed prevention structure comprising the wave shaped plastic optical fiber 120 can be enhanced.

As shown in FIG. 4, a transparent plate 130 through which the light irradiated from the plastic optical fiber 120 can penetrate may be installed on the structural body 110 corresponding to a position above where the plastic optical fiber 120 is installed.

The transparent plate 130 can be made of a material which has an inherent transparency by which the transmittance of the light can be enhanced to secure perceptivity and cannot be damaged by movement of vehicles and can absorb the shock. For example, the transparent plate 130 may made of a transparent urethane material or a transparent plastic material, but may be made of other materials which can be substituted for the above materials.

For example, in a case where the structural body 110 is made of synthetic rubber, the transparent plate 130 may be made of a transparent urethane or a transparent plastic material, but the transparent plate 130 is not necessarily limited to the above materials.

FIG. 4 shows that the transparent plate 130 is spaced apart from the plastic optical fiber 120, but the present invention is not limited to this situation. That is, the transparent plate 130 may be installed such that the transparent plate is in contact with a surface of the plastic optical fiber 120 or a part of surface or overall surface of the plastic optical fiber 120 is covered with the transparent plate.

According to the overspeed prevention structure 100 of the present invention as described above, perceptivity and reliability of the overspeed prevention structure can be secured for a long time due to the light radiation effect caused by the plastic optical fiber.

Furthermore, energy efficiency is excellent because a large area is illuminated by means of single or plurality light sources, and a change of environmental conditions such as water submersion, heat and shock can be overcome by the installation of the plastic optical fiber 120 acting as a transmitting medium for the light in the overspeed prevention structure, and so an overspeed prevention structure having excellent maintenance and repair properties may be provided.

The overspeed prevention structure according to the present invention is advantageous in that perceptivity and reliability can be secured for a long time by employing the plastic optical fiber to which the light is transmitted from the external light source, the light can illuminate a large area of the overspeed prevention structure to obtain excellent energy efficiency, and excellent maintenance and repair properties can be achieved by installing the plastic optical fiber acting as the light transmitting medium in the structural body.

Though the present invention has been described with reference to a limited number of exemplary embodiments thereof, it should be understood that numerous other modifications and variations can be devised by those skilled in the art that will fall within the spirit of the present invention and the scope of the claims described below and their equivalents.

What is claimed is:

1. An overspeed prevention structure to be placed on vehicle roads, comprising:

a structural body having a curved convex upper surface and a flat lower surface in contact with the vehicle road's surface;

an external light source being outside the structural body; and a plastic optical fiber embedded in the structural body and connected optically to the external light source to emit light outside the structural body, wherein the plastic optical fiber is disposed in the structural body in the shape of a loop so that a plurality of straight portions thereof are extended in parallel, wherein the whole surface of each plastic optical fiber is surrounded by and in direct contact with the structural body, and wherein the structural body is made of a synthetic resin, a transparent urethane or a transparent plastic.

2. The overspeed prevention structure of claim 1, further comprising transparent plates provided in the upper side of the structural body at the positions where the plastic optical fiber is disposed.

* * * * *